(12) United States Patent
Ding et al.

(10) Patent No.: US 8,582,803 B2
(45) Date of Patent: Nov. 12, 2013

(54) EVENT DETERMINATION BY ALIGNMENT OF VISUAL AND TRANSACTION DATA

(75) Inventors: Lei Ding, Columbus, OH (US); Quanfu Fan, Somerville, MA (US); Prasad Gabbur, Sleepy Hollow, NY (US); Arun Hampapur, Norwalk, CT (US); Sachiko Miyazawa, Bronx, NY (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/905,272

(22) Filed: Oct. 15, 2010

(65) Prior Publication Data

US 2012/0093370 A1 Apr. 19, 2012

(51) Int. Cl.
*G06K 9/00* (2006.01)

(52) U.S. Cl.
USPC ............ 382/100; 382/106; 348/143; 348/150

(58) Field of Classification Search
USPC .......... 382/103, 107, 209, 218, 106; 700/108; 348/143, 150
See application file for complete search history.

(56) References Cited

U.S. PATENT DOCUMENTS

| 6,236,736 | B1 | 5/2001 | Crabtree et al. |
| 7,889,068 | B2 * | 2/2011 | Connell et al. ................ 340/522 |
| 7,957,565 | B1 * | 6/2011 | Sharma et al. ................ 382/115 |
| 2006/0104479 | A1 | 5/2006 | Bonch-Osmolovskiy |
| 2007/0282665 | A1 | 12/2007 | Buehler et al. |
| 2008/0218591 | A1 | 9/2008 | Heier et al. |
| 2008/0303902 | A1 | 12/2008 | Romer et al. |
| 2009/0026269 | A1 | 1/2009 | Connell, II et al. |
| 2010/0135528 | A1 | 6/2010 | Bobbitt et al. |

OTHER PUBLICATIONS

S. Pankanti et al, Multi-media Compliance: A practical paradigm for managing business integrity, IEEE, Jan. 2009, pp. 1562-1563.

* cited by examiner

*Primary Examiner* — John Strege
(74) *Attorney, Agent, or Firm* — Patrick J. Daugherty; Driggs, Hogg, Daugherty & Del Zoppo Co., LPA

(57) ABSTRACT

Determination of human behavior from an alignment of data streams includes acquiring visual image primitives from a video input comprising visual information relevant to a human activity. The primitives are temporally aligned to an optimally hypothesized sequence of primitives transformed from a sequence of transactions as a function of a distance metric between the observed primitive sequence and the transformed primitive sequence. More particularly, transforming includes comparing the distance metric costs and choosing and performing the lowest cost of temporally matching the observed primitives to one or more transactions, deleting a primitive, or associating a primitive with a pseudo transaction marker. Accordingly, alerts are issued based on analysis of the transformation of primitives.

20 Claims, 4 Drawing Sheets

EVENT DETERMINATION BY ALIGNMENT OF VISUAL AND TRANSACTION DATA

BACKGROUND

The present invention relates to the analysis of human activities, and in one aspect to accurately determining and distinguishing behaviors represented in videos.

In a variety of contexts there may be a desire to monitor human activities for the occurrence or omission of certain activities, for example to comply with activity processes and policies. Compliance failures may result in injuries from failure to observe safety regulations or physical barriers, theft in business and retail establishments and other losses or loss exposures. Gaps in procedure may be identified for remedy, for example through retraining, by capturing and recording behavior deviations with video systems for subsequent or contemporaneous analysis. However, human review and analysis of video feeds is time consuming and perhaps inefficient with respect to human resources allocations, and accordingly it is desirable to implement automated systems for video analysis. Automated analysis of videos for determining human activities and behaviors presents a number of challenges, including providing for desired levels of accuracy in determinations of occurrences of human activities of concern, which must be recognized and sometimes distinguished from other activities, and wherein false alerts and missed event recognitions must occur at an acceptable level.

BRIEF SUMMARY

One embodiment of a method for determination of human behavior from an alignment of data streams includes acquiring visual image primitives from a video input comprising visual information relevant to a human activity. The primitives are temporally aligned to an optimally hypothesized sequence of primitives transformed from a sequence of transactions as a function of a distance metric between the observed primitive sequence and the transformed primitive sequence. More particularly, transforming includes comparing the distance metric costs and choosing and performing the lowest cost of temporally matching the observed primitives to one or more transactions, deleting a primitive, or associating a primitive with a pseudo transaction marker. Accordingly, alerts are issued based on analysis of the transformation of primitives.

In another embodiment, a computer system determines human behavior from an alignment of data streams and includes a processing unit, computer readable memory, a computer readable storage system and program instructions stored on the computer readable storage system for execution by the processing unit via the computer readable memory. The computer system acquires visual image primitives from a video input comprising visual information relevant to a human activity and temporally aligns them into an optimally hypothesized sequence of primitives transformed from a sequence of transactions as a function of a distance metric between the observed primitive sequence and the transformed primitive sequence. More particularly, transforming includes comparing the distance metric costs and choosing and performing the lowest cost of temporally matching the observed primitives to one or more transactions, deleting a primitive, or associating a primitive with a pseudo transaction marker. Accordingly, alerts are issued based on analysis of the transformation of primitives.

In another embodiment, a computer program product for determination of human behavior from an alignment of data streams comprehends a computer readable storage medium and program instructions stored therein to acquire visual image primitives from a video input comprising visual information relevant to a human activity and temporally align them into an optimally hypothesized sequence of primitives. The sequence is transformed from a sequence of transactions as a function of a distance metric between the observed primitive sequence and the transformed primitive sequence. More particularly, transforming includes comparing the distance metric costs and choosing and performing the lowest cost of temporally matching the observed primitives to one or more transactions, deleting a primitive, or associating a primitive with a pseudo transaction marker. Accordingly, alerts are issued based on analysis of the transformation of primitives.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
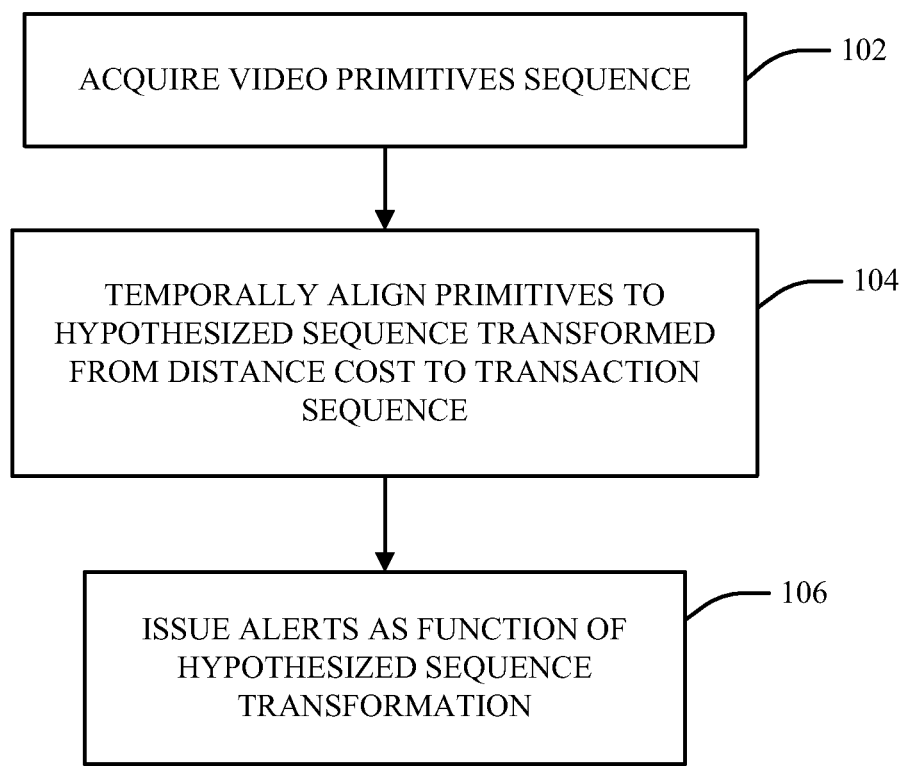
FIG. 1 illustrates an embodiment of a method or system for determination of human behavior from an alignment of data streams according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of human activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Automated video surveillance systems and methods are known wherein computers or other programmable devices directly analyze video data and attempt to determine the occurrence of activities of concern. However, object tracking by prior art automated video surveillance systems and methods systems is often not reliable in a realistic, real-world environments and applications due to clutter, poor or variable lighting and object resolutions and distracting competing visual information.

Some approaches may focus instead on data outputs associated with human activities, business transaction logs, retail receipts, injury reports, etc. Such data may be stored in an intermediate storage medium, such as a relational database, which is then subject to human queries and/or data mining processes. While such data mining processes may be effective in finding some incidents of interest, many statistical anomalies are not strongly correlated with an activity of concern, thus limiting the efficacy of pure data mining. Moreover, events detectable through data mining are necessarily limited to events strongly tied to a paper trail or other data representation output, and accordingly such methods may fail to capture a purely visual event not associated with such a data output; for example, an employee or agent neglecting to place a "Caution" sign near a public area that has just been mopped. Further, some events partly described by a process log may not indicate an associated activity amenable to detection through visual analysis of a video feed, for example where a first authorized person swipes a badge in a badge entry system to gain entry and is tailgated by another, second unauthorized or unrecognized person, the second person also thereby gaining entry without leaving a badge-swipe record.

Referring now to FIG. 1, an embodiment of a method or system for determination of human behavior from an alignment of data streams according to the present invention is illustrated. At 102 a plurality of different types of visual image primitives are acquired from a (first) video input or data stream (for example, still images or selections of video) relevant to one or more human activities, each comprising visual information relevant to a human activity.

At 104 a programmable device temporally aligns the primitives into an optimally hypothesized sequence of primitives transformed from transactions in a sequence of temporally ordered transactions from another (second) data stream as a function of a distance metric between the observed primitive sequence and the transformed primitive sequence. More particularly, transforming includes comparing the distance metric costs and choosing and performing the lowest cost of temporally matching the observed primitives to one or more transactions, deleting a primitive, or associating a primitive with a pseudo transaction marker. Thus, a lowest-cost option may include augmenting the sequence of transaction events by inserting pseudo transaction markers in association with observed visual image primitives (or with visual event groupings formed about a relevant primitive) that are not aligned or deleted, i.e. they are missing a corresponding transaction in the input sequence but the cost of deleting them or aligning them is too high.

At 106 alerts are issued based on analysis of the transformation of primitives. More particularly, the lowest-distance-metric-cost deletions and associations with pseudo transaction markers are noted as indicators of events of concern. In some embodiments, associations with pseudo transaction markers are clear indications of events of concern and alerts are automatically generated for each, wherein lowest-distance-metric-cost deletions do not generate alerts but instead are noted for further analysis.

More particularly, transformation of the primitives into the optimal sequence may comprise ordering the primitives into visual event groupings involving a human activity that should have a corresponding, matching transaction in the transaction events sequence. Embodiments of the present invention utilize an alignment mechanism that creates visual event sequence and sub-sequence tokens as a function of a distance metric indicative of a similarity or dissimilarity between the respective visual event and transaction token sequences. Operations are performed on visual event groupings not directly aligned with one or more of the transactions, with misalignments accounted for by altering the visual event or its alignment characteristic in order to create an alignment with a transaction, or deleting the visual event (thus recognizing a mistaken visual event creation). Generally, where the metric indicates at 104 that alteration or deletion operations are not indicated, then a pseudo transaction is inserted for association with said visual event and which indicates that the activity captured by and represented by said event grouping is of concern; for example, that an illegal or intentionally fraudulent activity has been committed in order to avoid the creation of a corresponding expected transaction in the transaction data stream.

Embodiments of the present invention may be utilized in a variety of applications wherein visual events may be associated with discrete, time-ordered transactions. For example, visual events may be created with respect to human movements in certain areas and matched to turnstile admissions, vehicles detected in relation to a transit point, badge or card swipes from an automated door lock, ticket kiosk, etc., which indicate trespassing, theft, unauthorized access to restricted areas, etc. Approaches may focus on a variety of data outputs associated with human activities, for example business transaction logs, retail receipts, injury reports, etc. Thus the present invention is not limited to only those examples provided herein.

Figure 2:
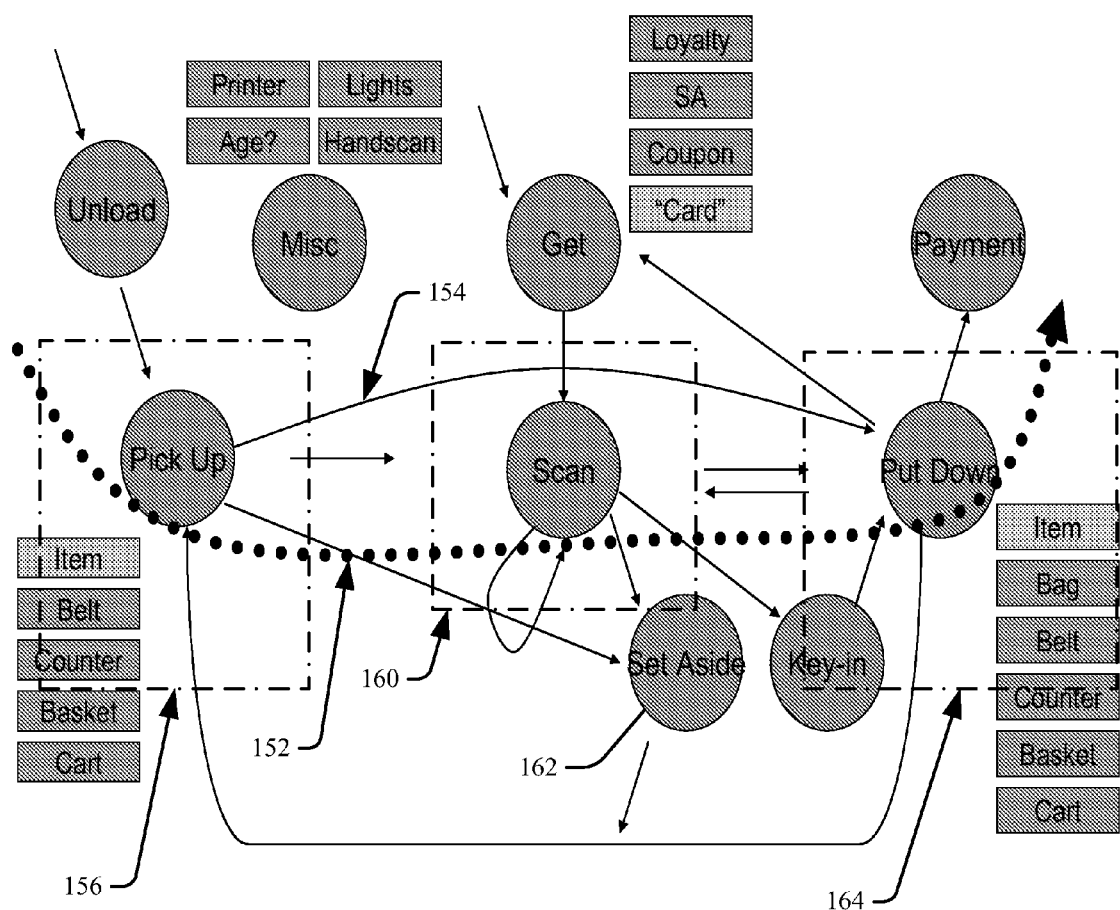
FIG. 2 illustrates an overhead perspective state diagram of possible human movements for automated recognition according to the present invention.

Some illustrative but not exhaustive examples of the present invention include implementations to detect and distinguish inserted pseudo transactions as fraudulent retail "sweet-hearting" events from other events that are not intentional frauds but may nonetheless also trigger alarms or other alerts of concern in prior art systems. For example, FIG. 2 is an overhead perspective state diagram of a plurality of possible movements and actions 162 of a cashier in a retail context (for example of a scanning lane) with respect to possible movement vectors 152, 154. (It will be understood that as used herein "cashier" is a generic term to denote a person scanning an item, and that embodiments contemplate that the scanning person may be a clerk or cashier as well as a customer, bagger, manager or other person.) In a simple scanning motion path vector 152, an item is picked-up from a pick-up area 156, scanned by passing the item within scanning range of a scanner in a scanning area 160 and then put down in a bagging or drop area 164. Examples of the pick-up areas 156 include an intake belt, a counter, a shopping basket and a cart, and the put-down area 164 may be one or more of a distribution belt, counter, shopping basket or shopping cart, each of which may entail different motions. The vectors 154 each represent an observed motion relative to other actions 162 of a cashier and observable in a video feed, illustratively including unloading items, and getting and scanning loyalty cards, supervisor/assistant override cards (SA), coupons or other bar-code cards.

A significant portion of retail shrink may be attributed to employees and occurs around cashiers at the point of sale (POS). Sweet-hearting or "fake scanning" describes the action of a cashier in intentionally failing to scan or otherwise enter an item into a retail transaction in order to provide the merchandise free of charge for a customer presenting the items for purchase, usually by moving the item from an input (pick-up) location through the processing (scan) area and into the output (drop or bagging) area by covering up the item bar code, stacking an item on top of another to occlude the scanner from reading the code or passing the item around the scan area during a scan motion to intentionally avoid a bar code reader in the scan area with respect to a bar code of the free item.

However, determining sweet-hearting through automated video analysis often fails to distinguish other events. For example, long-scanning events are legitimate scanning events that exhibit a long time gap between pick-up, scan and/or drop events in a given retail transaction of an object, and this long time gap may result in an erroneous report of a missing or fake scan or other system failure to capture the scanned information. The motion vectors 152, 154 may entail different motions relative to others of the vectors 152, 154, and they may also have different time signatures (for example, it may take longer to reach into a cart for a pick-up or a drop relative to a belt pick-up or drop). Movement of items from the pick-up area 156 may bypass the scanning area 160 before entering the put-down area 164 for legitimate purposes, for example to set aside in combination with directly keying-in of an item code with a missing or damaged bar code, or in weighing an item sold by weight. Video feeds for individual scans may also differ as a result of different cashier or environmental characteristics, for example lighting may change due to time of day (daylight versus artificial lighting at night), and the age or physical size or ability of the individual cashiers may impact the range of arm motion, motion paths selected or the times to complete similar paths relative to other cashiers, and any of these attributes may result in a long-scan falsely reportable as a sweet-hearting.

In embodiments of the present invention for implementation in the retail context of FIG. 2, the plurality of transaction events of a first data stream for temporal alignment with second stream visual events (e.g. at 102 of FIG. 1) may be bar code scans recorded by a register; thus, a plurality of transaction events {Tr} may be described as Tr={$B_1, B_2, \ldots, B_n$}, where {B} is an individual barcode transaction. Other embodiments and implementations may use other transactions, and illustrative but not exhaustive examples include turnstile admissions, vehicles detected in relation to a transit point, badge or card swipes from an automated door lock, ticket kiosk, etc. Thus, though the present embodiment is described with respect to bar code scans, it will be understood by one skilled in the art that any series of associated, discrete time-ordered transactions may be used to create video segments according to the present invention.

The visual primitives acquired at 102 events for temporal alignment with the transaction events are images or vide selection of depicting human activity expected and associated with the transactions. More particularly, a bar code transaction may be generated or otherwise associated with three basic visual events that occur in a temporally sequential order: first picking up an item {P} from a pick-up area (e.g. 156, FIG. 2), then scanning the picked-up item {S} in the scanning area (e.g. 160), and lastly depositing the picked-up and scanned item {D} to a customer delivery area (e.g. 164). Thus, each barcode scan {B} should correspond to a set of one each of these three different image primitives types {PSD}.

Video input may be analyzed to recognize and generate individual primitives {P}, {S} and {D} at 102 through a variety of methods and systems; the video input data may also be provided as one of the respective primitives to embodiments of the present invention at 102, for example by one ore more service providers or other devices or processes. In some embodiments, distinct Region of Interests (ROI) may be defined for the creation of and analysis of the segments/primitives, and motion pixels obtained by frame differencing (or differentiating) a video stream may counted in each ROI for each frame and normalized by the area of the ROI. Referring again to FIG. 2, in an embodiment adapted to determine sweet-hearting in an "in/out" scanning process, a pick-up area 156, a scan area 160 and a drop-off area 164 are defined for creating respective pick-up {P}, scan {S} and drop-off {D} primitives as a function of patterns observed in motion sequences within said areas, generally in response to motion pixels associated with the movement of an item and/or a hand (or both hands) of a cashier within each region. Each area 156/160/164 may itself define a ROI, with motion pixels obtained by frame differencing a video stream are counted in each ROI for each frame and normalized by the area of the respective ROI 156/160/164. Alternatively, any region 156/160/164 may encompass multiple distinct (and sometimes overlapping) ROI's to provide additional granularity or primitive creation capabilities.

Figure 3:
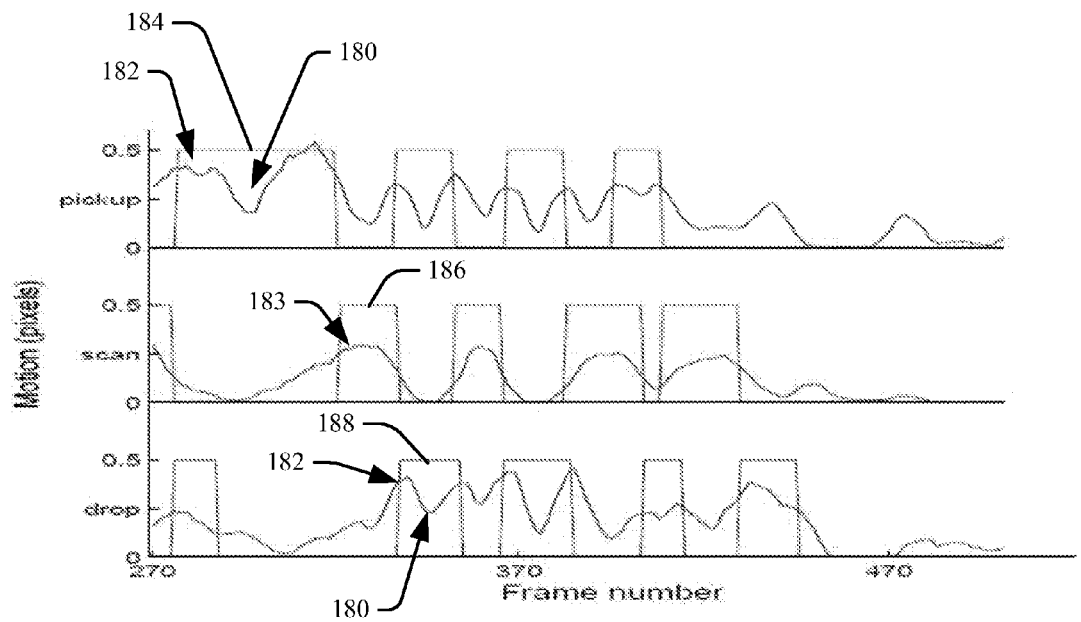
FIG. 3 is a graphical illustration of primitive motion sequences according to the present invention.

One example distinguishing motion patterns observed in resulting motion sequences within ROI's appropriate for practice with the present invention is taught by "Detecting Sweethearting in Retail Surveillance Videos" by Quanfu Fan et al., ICCASSP, 2009, wherein FIG. 3 provides exemplary graphical illustrations for motion sequences for each of pickup {P}, scan {S} and drop {D} events. Each pickup and drop event may be recognized by a pair of peaks 182 with a valley 180 located in-between, depicting a motion change caused by an interaction between a cashier's hand(s) and a specified region during an event. The valleys 180 correspond to the moment of a short pause when a hand is about to reach an item (pickup {P}) or to retrieve an item (drop {D}), and the locations of the two associated peaks 182 roughly correspond to a start and an end time of an event.

In some embodiments, feature extraction comprehends Space-Time Interest Points (STIPs), spatiotemporal features computed from local image points with both large intensity change and large variations in time and roughly correspond to moments when there is abrupt motion change, such as stopping or starting; for example, see "Space-time interest points," I. Laptev and T. Lindeberg, ICCV 2003 at pp. 432-439. Thus, several STIPs may be detected near a cashier's hand at the moment when the hand is about to reach or pickup {P} or drop {D} an item, and a STIPs detector may automatically select spatial and temporal scales with regard to the size and duration of said events wherein a spatio-temporal volume is formed for each STIP and further divided into grids of cuboids. In some embodiments, histograms of oriented gradient (HoG) and optic flow (HoF) may be computed, normalized and concatenated into a local descriptor for each cuboid.

In some embodiments, a Bag of Features (BOF) model is built to represent an event wherein spatio-temporal features from a specified region are clustered into discrete "visual words" groups based on their similarities and a histogram of word occurrence frequency is constructed to form a compact representation of the event, the histogram representation is used for classification with approaches. Examples of BOF modeling are taught by "Learning realistic human actions from movies" by Marszalek et al., CVPRO8 2008, and other examples will be apparent to one skilled in the art.

Still other embodiments may take locally maximum points of a squared weighted gradient norm function as the interest points in a video, for example pursuant to a function representing gray-scale values of a video primitive. Thus, embodiments of the present invention may utilize a detector that takes locally maximum points of a squared weighted gradient norm function as interest points in the video primitives, for example pursuant to the following function [1]:

$$g(x, y, t) = \left(\frac{\partial I}{\partial x}\right)^2 + \left(\frac{\partial I}{\partial y}\right)^2 + \alpha\left(\frac{\partial I}{\partial t}\right)^2; \quad [1]$$

wherein I(x,y,t) represents gray-scale values of the video clip, α is larger than 1 to emphasize the fact that temporally salient points are more likely to be related to interesting events. Points (x, y, t) with relatively small g function values below a threshold $P^{th}$ percentile over a whole video clip are also excluded in order to achieve truly spatial-temporal salient points. Thus, two kinds of features may be extracted from the video primitives relative to (i.e. around and at) the interest points: averaged color values in a small window around the interest points, i.e., [Red,Green,Blue]; and image gradient vectors, i.e. the terms [dI/dx, dI/dy] of formulation [1]. Said features together may compose a color feature or description vector containing both appearance and texture information at each detected interest point in a video. Accordingly, in one embodiment, each event primitive {P}, {S} or {D} may be treated as a bag of features (BOF). For example, a pick-up primitive {P} may be defined according to formulation [2]:

$$P = \{p_i\}_{i=1}^{NP} \quad [2]$$

wherein $p_i$ is a color feature vector.

Figure 4:
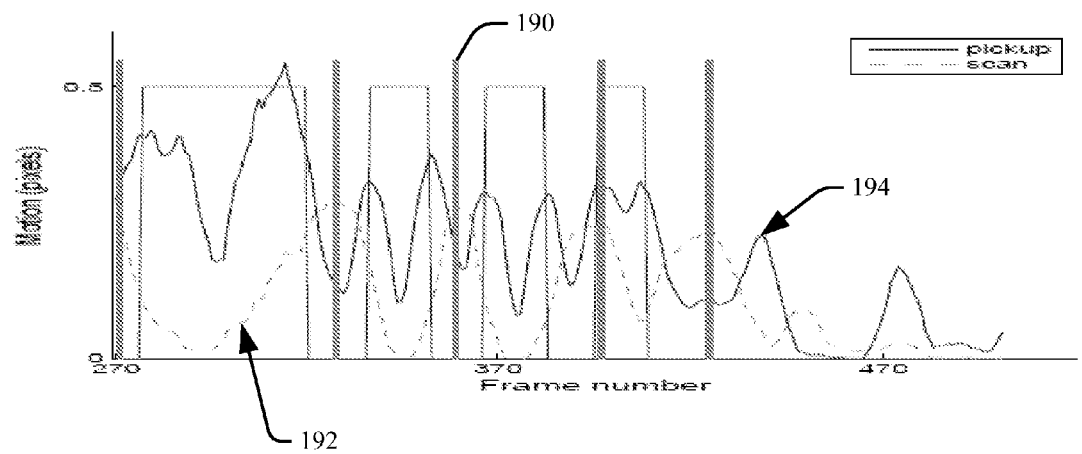
FIG. 4 is a graphical illustration of primitive motion peaks according to the present invention.

While patterns indicated by primitive events may be visually identifiable, it may be difficult in prior art approaches to segment them in a meaningful way in a motion sequence. Pickup {P}, scan {S} and drop {D} primitives occur sequentially, thus temporal ordering them into an event {PSD} suggests that there should be one pickup 184 prior to a scan 186 which is followed by a drop 188, which provides guidance in identifying a primitive or segment type and applying the appropriate motion thresholding. For example, referring to FIG. 4, motion peaks 190 in each scan profile 192 may be located and used as dividers to separate pickup {P} and drop {D} events (illustrated presently through overlaying the scan profile 192 and a pick-up motion profile 194.

Figure 5:
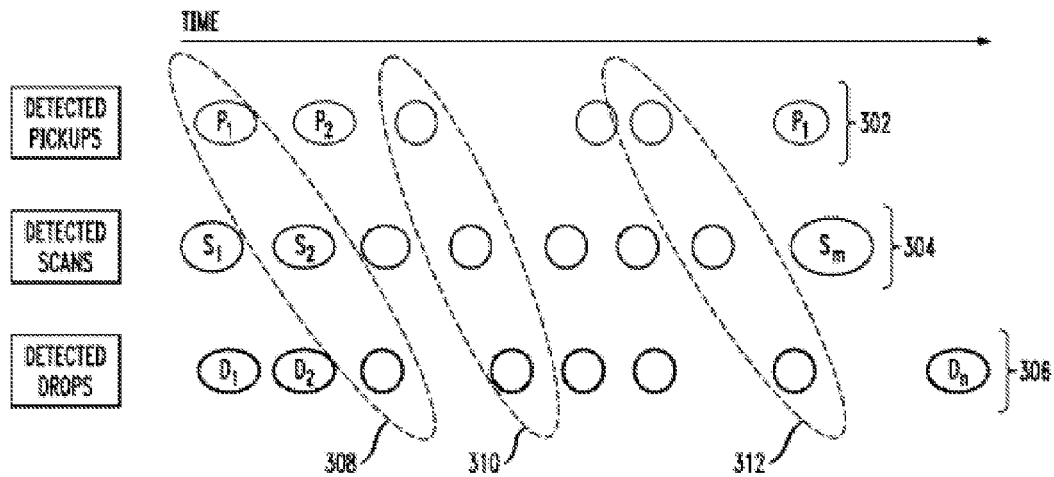
FIG. 5 is a diagram illustrating combining primitives into high-level visual events according to the present invention.

FIG. 5 is a diagram illustrating combining detected pickup {P} 302, scan {S} 304 and drop {D} 306 primitives into high-level event triplets {PSD} 308, 310 and 312, in one aspect by maximizing an objective function based on temporal constraints of the primitives. More particularly, pickup, scan and drop occur in order, usually with short time gaps, and thus may be combined into high-level visual scan events by considering their sequential ordering through exploring types of temporal constraints, for example time gaps between consecutive visual scans and/or durations of said visual scans. For example, let $P=\{P_1, P_2, \ldots, S=\{S_1, S_2, \ldots, S_m\}$ and $D=\{D_1, D_2, \ldots, D_n\}$ be pickup, scan and drop events detected during a transaction, respectively. Also let $t_s(E_i), t_e(E_i)$ denote the start and end time of an event $\{E_i\}$. An event $\{E_i\}$ may be defined to occur before another event $\{E_j\}$, i.e, $\{E_i < E_j\}$, if $\{t_s(E_j) + \epsilon \geq t_e(E_i)\}$ where $\{\epsilon\}$ is a small non-negative number selected to tolerate detection errors. A visual scan event triplet Tr(i, j, k)} may be defined to filter unlikely event candidates as three primitives $(P_i, S_j, D_k)$ that occur sequentially such that $\{P_i < S_j < D_k\}$ and $\{t_e(D_k) - t_s(P_i) \leq T\}$ where $\{T\}$ is a time threshold. Examples of $\{T\}$ include two, five and ten seconds, though other values may be practiced.

However, outputs of the processes described above may fail to generate single {PSD} triplets in direct temporal correlation with each bar code scan {B} (for example, having the same or correlated timestamp values). Some of the sub-event primitives {P}, {S} and {D} may be repeated more than once, or they may not be detected due to various reasons. One common situation arises when a cashier has difficulty scanning the item in a single attempt and ends up doing multiple scans resulting in repeated {S} primitives for a single item. Therefore, a primitive sequence output by a detection system may be noisy with repetitions and/or no occurrences of one or more of the {P}, {S} and {D} primitives, which poses difficulties to any approach looking for the presence of a {PSD} triplet corresponding to an item checkout.

Embodiments of the present invention optimally create and match each of a temporal sequence {V} of said visual scan events $\{V=\{PSD_1, PSD_2, PSD_3, \ldots, PSD_n\}\}$ to a corresponding temporal stream of transactions, in the present example to bar code scans {B} recorded by a register $\{Tr=\{B_1, B_2, \ldots, B_m\}$ by utilizing an alignment mechanism that creates visual event sequence and sub-sequence tokens as a function of a metric indicative of a similarity or dissimilarity between the respective visual event and transaction token sequences. Paradigms for visual compliance based on approximate text matching allow for missing or repeated primitives by assuming a noisy generative model for the {P}, {S} and {D} primitives around a barcode {B} and a distance measure for approximately matching generated triplets hypotheses with observed data (i.e., the visually detected primitives {P}, {S} and {D}).

In some embodiments, the similarity/dissimilarity metric is a string edit distance process is used to align the visual events {PSD} and bar codes {B}, transforming subsequences {P-D} starting from a {P} and ending at a {D} into one or more {PSD$_i$} aligned to bar code transactions. For example, a Levenshtein distance process is taught by the Russian scientist Vladimir Levenshtein in 1965 as a measure of the similarity between two strings, which may be refer to as the source string (s) and the target string (t). The distance is the number of deletions, insertions, or substitutions required to transform (s) into (t). For example, if s is "test" and t is "test", then LD(s,t)=0, because no transformations are needed. The strings are already identical. However, if s is "test" and t is "tent", then LD(s,t)=1, because one substitution (change "s" to "n") is sufficient to transform s into t. Generally, the greater the Levenshtein distance, the more different the respective strings are. A variant of string edit distance methodology is a Damerau-Levenshtein distance (named after Frederick J. Damerau and Vladimir I. Levenshtein) which includes insertion, deletion, substitution of a single character and transposition of character operations as the minimum number of operations needed to transform one string into the other, and still other variants and modifications will be apparent to one skilled in the art.

Embodiments may select and perform a lowest-cost option of visual event alteration, deletion or pseudo transaction marker insertion as a function of a string edit distance between visual events {PSD} and bar codes tokens {B}. Modification by adding missing barcodes to compensate for those cases where fake scan are possibly committed may thus be performed in response to a high transformation/alteration cost (for example, exceeding a threshold limit of operations), or where no operation may sufficiently alter or form a visual event sequence in order to align with a bar code transaction.

In one embodiment, alignment of a sequence of visual events $\{V=(PSD_1, PSD_2, PSD_3, \ldots, PSD_n)\}$ with a bar code stream $\{Tr=\{B_1, B_2, \ldots, B_m\}$ comprises the following operations: (i) "Delete (op1)," wherein a detected visual scan is skipped; (ii) "Match (op2)," wherein a detected visual scan consumes a {B} in the barcode sequence; and (iii) "Match-Add (op3)," wherein a new $\{B_k\}$, $\{k>m\}$ is created in the barcode sequence and consumed by a detected visual scan {PSD}. For a detected visual scan {V} (wherein it is noted that this need not be a true visual scan), a bar code entry {B}, and an $\{op_i\}$ corresponding to one of the Delete (op1), Match (op2) or "Match-Add (op3) alignment operations, an alignment device may apply Bayes theorem to align the visual event and bar code tokens:

$$P(op_i|V, B) \propto P(V, B|op_i)P(op_i) = P(V|op_i)P(B|V, op_i)P(op_i) \quad [3];$$

wherein $\{P(V|op_i)\}$ is a conditional or posterior probability of {V} given operation {i} learned from labeled data; $\{P(B|V, op_i)\}$ is the conditional probability on when the bar code {B} might happen given the current observed {V}; and $\{P(op_i)\}$ is the prior probability or marginal probability for operation {i}. An input sequence of bar code transactions $\{Tr=\{B_1, B_2, \ldots, B_m\}$ is thus augmented through a string edit process (or string edit-probability process) to form an augmented sequence {Tr'} such that each $\{PSD_i\}$ corresponds to a $\{B_i\}$, and wherein {Tr'} an extension of {Tr} in which missing barcodes caused by fake scans are added by the algorithm as indicated by the cost (for example, number of transactions, etc.).

In another embodiment for a sequence {Tr} of barcodes $\{B_1, B_2, \ldots, B_n\}$ where {n} denotes a corresponding number of items within a transaction, each barcode $\{B_i\}$ has an associated time stamp denoted by $\{t_{Bi}\}$. In an ideal situation, $\{t_{Bi}\}$ should also be a time stamp associated with a scan {S} primitive of the corresponding item's scan detected by the visual system. Due to various sources of noise, this may not be the case. Let $\{t_{Bi}^s\}$ denote the time stamp of the true {S} primitive corresponding to $\{B_i\}$. Assuming a Gaussian model, the likelihood of seeing {S} around $\{B_i\}$ is given by $$p(t_{Bi}^S|t_{Bi}) = \eta(t_{Bi}^S|t_{Bi}, \sigma_S^2) \quad [4]$$

where $\eta(.|\mu, \sigma^2)$ is a normal distribution with mean $\{\mu\}$ and variance $\{\sigma^2\}$. Similar likelihoods govern the generation of the true {P} and {D} primitives around the barcode $\{B_i\}$:

$$p(t_{Bi}^P|t_{Bi}) = \eta(t_{Bi}^S|t_{Bi} - \delta_P, \sigma_P^2) \quad [5]$$

$$p(t_{Bi}^D|t_{Bi}) = \eta(t_{Bi}^S|t_{Bi} - \delta_D, \sigma_D^2) \quad [6]$$

where $\{\delta_P\}$ and $\{P_D\}$ are offsets of the expected time points of the pickup $\{P\}$, and drop $\{D\}$ primitives respectively from the barcode time point $\{t_{Bi}\}$. The present model provides a way to generate primitive event hypotheses for an observed set of barcodes during a transaction, wherein each hypothesis is associated with a likelihood $\{L(S_B)\}$ of observing the primitive stream $\{S_B\}$ based on the set of barcodes $\{B\}$; and $\{S_O\}$ denotes the observed primitive stream output by the detection system, which is usually noisy with missing or repeated primitive events for any particular item scan. In some embodiments the two primitive event streams $\{S_O\}$ and $\{S_B\}$ are matched as best as possible in a search for a good set of visual events corresponding to item scans through an approximate text matching scheme, which may provide a more robust way to match the two streams rather than an absolute matching scheme. Accordingly, an edit distance $\{D(S_B, S_O)\}$ is used between the two streams $\{S_O\}$ and $\{S_B\}$ that handles insertions and/or deletions in either of the streams. The approximate matching problem can be cast as an optimization problem to search for the best hypothesis $\{S^*\}$, which maximizes a linear weighted sum of the likelihood and the edit distance measure:

$$S^* = [\arg\max S_B](L(S_B) + \alpha D(S_B, S_O)) \qquad [7]$$

where $\{\alpha\}$ is a weight that determines the importance of the edit distance measure relative to the likelihood.

Learning of the above model can be either supervised or unsupervised based on the availability of labeled training data. The parameters to be learnt include the variances $\{\rho^2\}$ of the Gaussians corresponding to the scan $\{S\}$, pickup $\{P\}$ and drop $\{D\}$ primitives, and the shifts of their expected positions $\{\delta\}$ relative to the barcode time, as provided in formulations [4], [5] and [6] above, respectively. Learning is straightforward given a training data set with labeled correspondences between barcodes and their respective $\{PSD\}$ triplets. In the absence of such labels, an Expectation Maximization (EM)-based approach can be used to estimate the missing correspondences and at the same time learn the model parameters: one example is taught by A. P. Dempster, N. M. Laird, and D. B. Rubin in "Maximum likelihood from incomplete data via the EM algorithm," Journal of the Royal Statistical Society, 39(1):1-38, 1977. The learnt model parameters may then be used in an optimization of equation [7].

It is also possible to use a learnt model in an alternative approach to approximate text matching. Instead of explicitly generating primitive stream hypotheses $\{S_B\}$ from the observed barcodes, it is possible to use an EM based approach for aligning the observed primitive stream $\{S_O\}$ with the barcode sequence. The learnt model parameters would then be used as a starting point for this EM procedure seeking a local likelihood maximum close to this starting point in the parameter space. This is equivalent to tuning the parameters to a new environment different from the one where the parameters were originally learnt, for example switching to a different cashier, lane or store.

Thus, in embodiments of the present invention, visual events may be detected from video and temporally ordered into a sequence, valid $\{PSD\}$ subsequences extracted (for example, those within some predefined time gap or threshold as discussed above) and temporally reordered, the cost of each defined operation on a $\{PSD\}$ computed, a string edit distance process applied, with only paths without temporal conflicts considered, and fake scans may be reported where new barcodes are inserted. By leveraging point-of-sale (POS) data at a scanning/cashier point that faithfully records what a cashier does, the present invention infers what occurs around a barcode scanning in a greater detail to help identify the challenging cases where event modeling may fail to capture subtle but suspicious activities. Suspicious incidents may thus be flagged by pseudo transaction insertions where inconsistencies between POS and visual detection occur, and which may further be distinguished from innocuous (e.g. long scanning) activities, which may instead be accounted for through visual event alteration or deletion as a function of string edit distance costs. Accordingly, in some embodiments, insertion of a pseudo transaction marker is a positive indication that the associated activity captured and represented by a primitive (P,S,D) grouping is an intentional "fake scan" and an alert is issued, and wherein a deletion is instead more likely, a long scan or other non-intentional activity that requires further analysis and consideration to determine a human activity represented thereby (for example by a human auditor) may in fact comprise a fake scan activity determination after said further analysis.

Relevant images or video portions may be identified and segmented from the video stream without requiring supervised learning, labeled data, complex modeling, human behavior inference schemes, or without knowing or determining ground truths of fraudulent cashier activity or prior knowledge of fraudulent activity. No prior knowledge of fraudulent activity required, and only assumptions regarding the primitives and their visual event construction $\{PSD\}$ are needed. Incorporation of logged transaction data into visual event $\{PSD\}$ formation and bar code alignment process at 104 directly enables fraud detection according to the present invention, rather than merely verifying fraud determined through other systems.

Figure 6:
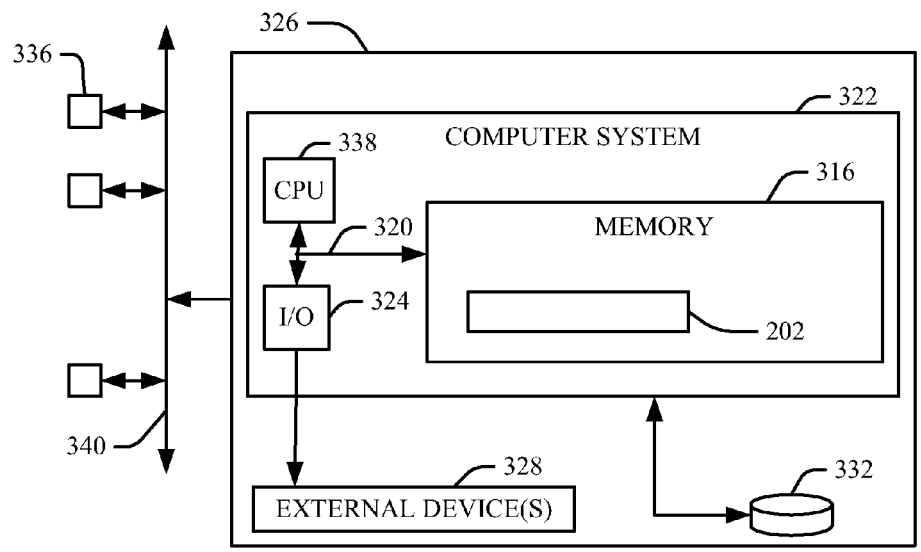
FIG. 6 is a computerized implementation of an embodiment of the present invention.

Referring now to FIG. 6, an exemplary computerized implementation of an embodiment of the present invention includes computer or other programmable device 322 in communication with devices 336 (for example a video camera or video server) that analyzes video data for determination of human behavior according to the present invention, for example in response to computer readable code 202 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication throughout the network 326 can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with one or more external I/O devices/resources 328 and storage systems 332. In general, the processing unit 338 may execute computer program code, such as the code to implement one or more of the process steps illustrated in FIG. 1, which is stored in the memory 316 and/or the storage system 332.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 328 can comprise any system for exchanging information with one or more of an external server and or client (not shown). Still further, it is understood that one or more additional components (e.g., system software, math co-processing unit, etc.) not shown can be included in the computer 322 or server or client.

One embodiment performs process steps of the invention on a subscription, advertising, and/or fee basis. That is, a service provider could offer to provide automated analysis of video data for determination of human behavior. In this case, the service provider can create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for automated analysis of video data for determination of human behavior described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following:
(a) conversion to another language, code or notation; and/or
(b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determination of human behavior from an alignment of data streams, the method comprising:
    acquiring a plurality of observed visual image primitives from a video input comprising visual information relevant to a human activity;
    temporally aligning via a programmable device the observed primitives into an optimally hypothesized sequence of primitives transformed from a temporally ordered sequence of transactions as a function of a distance metric between the observed primitives and the transactions by, for each of the observed primitives, performing a lowest cost one of the distance metric of temporally matching to at least one of the transactions, deleting the each observed primitive and associating the each observed primitive with the pseudo transaction marker; and
    issuing an alert as a function of the performed lowest distance metric cost one of the temporally matching to the at least one transaction, the deleting and the associating with the pseudo transaction marker.

2. The method of claim 1, wherein the issuing the alert as the function of the performed lowest distance metric cost one of the temporally matching to the at least one transaction, the deleting and the associating with the pseudo transaction marker comprises:

issuing an alert for each of the observed primitives associated with the pseudo transaction marker; and further analyzing each of the deleted observed primitives for determination of a human activity represented thereby.

3. The method of claim 1, wherein the temporally aligning the observed primitives into the optimally hypothesized sequence of primitives transformed from the temporally ordered sequence of transactions as the function of the distance metric between the observed primitives and the transactions further comprises ordering the observed primitives into discrete visual event groupings involving a human activity that should have a corresponding transaction in the transaction events sequence.

4. The method of claim 1 wherein the distance metric is a string edit distance between the observed primitives and the sequential transactions.

5. The method of claim 1, wherein the distance metric is a conditional probability of the each observed primitive given:
   the performed lowest distance metric cost one of the temporally matching to the at least one transaction, the deleting and the associating with the pseudo transaction marker;
   a conditional probability on when the at least one transaction might happen given the observed primitive; and
   a prior probability for the lowest distance metric cost one of the temporally matching to the at least one transaction, the deleting and the associating with the pseudo transaction marker.

6. The method of claim 1, wherein the distance metric cost is a likelihood of the each observed primitive being temporally around the at least one transaction as a function of Gaussian model normal distribution mean and variance and an offset of an expected time point of the each observed primitive from a time point of the at least one transaction.

7. The method of claim 6, further comprising determining the likelihood of the each observed primitive being temporally around the at least one transaction by:
   generating a primitive event hypothesis edit distance measure associated with a likelihood of observing a stream of the observed primitives as a function of the transactions; and
   maximizing a linear weighted sum of the likelihood of observing the primitive stream and an edit distance measure between the observed primitive stream and an observed primitive stream output by a detection system.

8. The method of claim 7, further comprising:
   weighting the edit distance measure by an importance of the edit distance measure relative to the likelihood of observing the primitive stream.

9. A computer system for determination of human behavior from an alignment of data streams, the computer system comprising:
   a processing unit, computer readable memory and a computer readable storage system;
   first program instructions to acquire a plurality of visual image primitives from a video input comprising visual information relevant to a human activity;
   second program instructions to temporally align the observed primitives into an optimally hypothesized sequence of primitives transformed from a temporally ordered sequence of transactions as a function of a distance metric between the observed primitives and the transactions by, for each of the observed primitives, performing a lowest cost one of the distance metric of temporally matching to at least one of the transactions, deleting the each observed primitive and associating the each observed primitive with the pseudo transaction marker;
   third program instructions to issue alerts as a function of the performed lowest distance metric cost one of the temporally matching to the at least one transaction, the deleting and the associating with the pseudo transaction marker; and
   wherein the first, second and third program instructions are stored on the computer readable storage system for execution by the processing unit via the computer readable memory.

10. The computer system of claim 9, wherein the second program instructions are further to align the observed primitives into the optimally hypothesized sequence of primitives transformed from the temporally ordered sequence of transactions as the function of the distance metric between the observed primitives and the transactions by ordering the observed primitives into discrete visual event groupings involving a human activity that should have a corresponding transaction in the transaction events sequence.

11. The computer system of claim 9, wherein the distance metric is a string edit distance between the visual event groups and the sequential transactions.

12. The computer system of claim 9, wherein the distance metric is a conditional probability of the each observed primitive given:
   the performed lowest distance metric cost one of the temporally matching to the at least one transaction, the deleting and the associating with the pseudo transaction marker;
   a conditional probability on when the at least one transaction might happen given the observed primitive; and
   a prior probability for the lowest distance metric cost one of the temporally matching to the at least one transaction, the deleting and the associating with the pseudo transaction marker.

13. The computer system of claim 9, wherein the distance metric cost is a likelihood of the each observed primitive being temporally around the at least one transaction as a function of Gaussian model normal distribution mean and variance and an offset of an expected time point of the each observed primitive from a time point of the at least one transaction.

14. The computer system of claim 13, wherein the second program instructions are further to determine the likelihood of the each observed primitive being temporally around the at least one transaction by:
   generating a primitive event hypothesis edit distance measure associated with a likelihood of observing a stream of the observed primitives as a function of the transactions; and
   maximizing a linear weighted sum of the likelihood of observing the primitive stream and an edit distance measure between the observed primitive stream and an observed primitive stream output by a detection system.

15. A computer program product for determination of human behavior from an alignment of data streams, the computer program product comprising:
   a computer readable storage device;
   first program instructions to acquire a plurality of visual image primitives from a video input comprising visual information relevant to a human activity;
   second program instructions to temporally align the observed primitives into an optimally hypothesized sequence of primitives transformed from a temporally ordered sequence of transactions as a function of a distance metric between the observed primitives and the transactions by, for each of the observed primitives, performing a lowest cost one of the distance metric of temporally matching to at least one of the transactions, deleting the each observed primitive and associating the each observed primitive with the pseudo transaction marker;

third program instructions to issue alerts as a function of the performed lowest distance metric cost one of the temporally matching to the at least one transaction, the deleting and the associating with the pseudo transaction marker; and wherein the first, second and third program instructions are stored on the computer readable storage device.

16. The computer program product of claim 15, wherein the second program instructions are further to align the observed primitives into the optimally hypothesized sequence of primitives transformed from the temporally ordered sequence of transactions as the function of the distance metric between the observed primitives and the transactions by ordering the observed primitives into discrete visual event groupings involving a human activity that should have a corresponding transaction in the transaction events sequence.

17. The computer program product of claim 15, wherein the distance metric is a string edit distance between the visual event groups and the sequential transactions.

18. The computer program product of claim 15, wherein the distance metric is a conditional probability of the each observed primitive given:

the performed lowest distance metric cost one of the temporally matching to the at least one transaction, the deleting and the associating with the pseudo transaction marker;

a conditional probability on when the at least one transaction might happen given the observed primitive; and a prior probability for the lowest distance metric cost one of the temporally matching to the at least one transaction, the deleting and the associating with the pseudo transaction marker.

19. The computer program product of claim 15, wherein the distance metric cost is a likelihood of the each observed primitive being temporally around the at least one transaction as a function of Gaussian model normal distribution mean and variance and an offset of an expected time point of the each observed primitive from a time point of the at least one transaction.

20. The computer program product of claim 19, wherein the second program instructions are further to determine the likelihood of the each observed primitive being temporally around the at least one transaction by:

generating a primitive event hypothesis edit distance measure associated with a likelihood of observing a stream of the observed primitives as a function of the transactions; and maximizing a linear weighted sum of the likelihood of observing the primitive stream and an edit distance measure between the observed primitive stream and an observed primitive stream output by a detection system.

\* \* \* \* \*